United States Patent [19]

Myers et al.

[11] 4,322,228
[45] Mar. 30, 1982

[54] PNEUMATICALLY ACTUATED ELECTRONIC CONTROL FOR A FLUID MIXTURE ADSORPTION SEPARATOR

[75] Inventors: William P. Myers; Terence A. Torzala; John W. Henneman, all of Davenport, Iowa

[73] Assignee: The Bendix Corporation, Southfield, Mich.

[21] Appl. No.: 179,138

[22] Filed: Aug. 18, 1980

Related U.S. Application Data

[63] Continuation of Ser. No. 24,935, Mar. 29, 1979, abandoned, which is a continuation of Ser. No. 839,966, Oct. 6, 1977, abandoned.

[51] Int. Cl.$^3$ .............................................. B01D 53/00
[52] U.S. Cl. ...................................... 55/163; 55/179; 55/180; 55/389
[58] Field of Search .................... 55/21, 33, 62, 74, 75, 55/161–163, 179, 274, 275, 387, 389, 180

[56] References Cited

U.S. PATENT DOCUMENTS

| | | | |
|---|---|---|---|
| 2,703,628 | 3/1955 | Pompeo et al. | 55/161 |
| 3,080,693 | 3/1963 | Glass et al. | 55/62 X |
| 3,324,631 | 6/1967 | Kreuter | 55/163 |
| 3,400,511 | 9/1968 | Yamanouchi | 55/179 X |
| 3,464,186 | 9/1969 | Hankison et al. | 55/163 |
| 3,714,763 | 2/1973 | Suzuki | 55/163 |
| 3,775,946 | 12/1973 | Brazzel | 55/179 X |
| 3,867,111 | 2/1975 | Knowles | 55/163 X |
| 4,047,904 | 9/1977 | Worrall | 55/161 X |
| 4,101,298 | 7/1978 | Myers et al. | 55/163 |

Primary Examiner—Robert H. Spitzer
Attorney, Agent, or Firm—Leo H. McCormick, Jr.; Ken C. Decker

[57] ABSTRACT

A control system for sequentially communicating a source of pressurized fluid mixture to first and second beds of adsorption material to separate at least one component from the fluid mixture and produce a product fluid. A pressure transducer connected to a supply conduit develops a switching signal corresponding to a predetermined fluid pressure in the fluid mixture communicated to the first and second beds of adsorption material. An electronic controller responds to the switching signal to sequentially develop first and second electrical signals. The electronic controller allows the first and second electrical signals to overlap for a predetermined controlled time period. Valve mechanisms sequentially respond to the first and second electrical signal to prevent communication of the fluid mixture to one of the first and second chambers while allowing communication to the second chamber. A first branch of an outlet conduit connects the first bed of adsorpton material to a storage chamber while a second branch of the outlet conduit connects the second bed of adsorption material to the storage chamber. An equalizer valve located in an intermediate conduit between the first and second branches of the outlet conduit, reacts to first and second overlap of the electrical signals to allow the fluid pressure in the first and second beds of adsorption material to equalize when the communication of fluid mixture to the first and second beds of adsorption material is interrupted to complete a cycle of operation.

33 Claims, 4 Drawing Figures

PNEUMATICALLY ACTUATED ELECTRONIC CONTROL FOR A FLUID MIXTURE ADSORPTION SEPARATOR

This is a continuation of application Ser. No. 24,935, filed Mar. 29, 1979 which was a continuation of application Ser. No. 839,966 filed Oct. 6, 1977, both abandoned.

BACKGROUND OF THE INVENTION

Oxygen separators such as disclosed in U.S. Pat. No. 3,880,616, separate fluid mixtures into first and second component parts through the retention of one component in a bed of adsorption material while allowing the other components to flow therethrough. In order to provide for continuous operation, it is common practice to use two beds of adsorption material simultaneously, adsorbing one bed while desorbing the other bed. A first series of solenoid valves associated with the two beds allow the fluid mixture to freely flow to a first of the two beds where one component is retained while a product effluent flows to a storage container through a conduit. At the same time a portion of the product effluent enters a second of the two beds and purges the same of the one component previously retained therein. After a fixed period of time, a signal from a timing mechanism deactivates the first series of solenoid valves and activates a second series of solenoid valves to reverse the communication of the fluid mixture from the first of the two beds to the second. The first bed of adsorption material previously producing the product effluent is now purged by a portion of the product effluent produced in the second bed.

Theoretically, the volume of fluid mixture passing through the first and second beds of adsorption material should be equal. However in practice it has been observed that the beds of adsorption materials are nearly always different. Such difference can result from minute changes in size between the beds, variations in the density of the beds, and variations in the quality of the beds such as porosity and moisture content. In addition, a few seconds change in the operation of the solenoid control valves by the timing mechanism can cause a degradation of the beds.

Thus, one of the two beds is always producing more of a product effluent than the other. The overproducing bed experiences a component breakthrough which dilutes the product effluent during its adsorption part of the operational cycle while the underproducing bed has an excessive amount of the component retained therein at the initiation of its adsorption cycle. The underproducing bed never reaches its output potential since the adsorption cycle is terminated before the product effluent output peaks.

One method of providing identical beds requires the testing of the adsorption capacity of the beds as they are produced and thereafter selecting matching beds of the same capacity for each unit. Unfortunately, this type of quality control does not lend itself for rapid manufacturing production.

Another method of acquiring optimum output from an oxygen separator requires the use of an electrical timer whereby the operation of the solenoid control valves can be varied to match the adsorption capacity of the beds. The underproducing bed cycle of adsorption is lengthened while the overproducing bed cycle is shortened until both beds are operating at top efficiency. However, this solution is only temporary since after an extended period of time the beds become unbalanced in the opposite direction since the retained component is never completely purged from the one bed.

In copending U.S. patent application Ser. No. 784,901 filed Apr. 5, 1977 and now U.S. Pat. No. 4,101,298, a pneumatic logic sequencer is disclosed for controlling the transfer of the pressurized fluid mixture between the first and second beds of adsorption material. A first pressure sensor connected to the first bed of adsorption material and a second pressure sensor connected to the second bed of adsorption material supply the logic sequencer a pneumatic signal representative of the fluid pressure in the first and second beds of adsorption material, respectively. In response to a predetermined pressure differential, the logic sequencer transfers the pressurized fluid mixture to the bed of adsorption material having the lower fluid pressure.

SUMMARY OF THE INVENTION

In evaluating the operation of the oxygen separator apparatus, it was discovered that the fluid pressure in the supply conduit varied as a function of the rate of adsorption of components by the adsorption material and the flow of the fluid mixture through a bed of adsorption material being pressurized. Thereafter, it was determined that an operational signal could be derived from a single pressure transducer placed in the supply conduit to control the sequential transfer of the operation supply of fluid mixture between the first and second beds of adsorption material whenever a predetermined fluid pressure condition was present in the supply conduit. The operational signal from the pressure transducer activates an electronic controller mechanism wherein first and second electrical signals are sequentially produced. The duration of the first and second electrical signals being a function of a fixed time period plus the duration of the operational signal as determined by the fluid pressure of the mixture in the supply conduit. Thus, the first and second electrical signals overlap for the fixed time period. A first series of valves responds to the first electrical signal to prevent the fluid mixture from flowing into the first bed of adsorption material and a second series of valves responds to the second electrical signal to prevent the fluid mixture from flowing into the second bed of adsorption material. An outlet conduit connected to the first and second beds of adsorption materials communicates any product fluid produced to a storage chamber. A third valve located in an intermediate conduit connected to the outlet conduit responds to the simultaneous operation of the first and second series of valves caused by the overlap of the first and second electrical signals to provide for pressure equalization between the first and second beds of adsorption materials prior to the shift in the fluid mixture between the first and second beds. With a single pressure transducer controlling the communication of the fluid mixture to both the first and second beds of adsorption material, a shift in the trip or actuation point within the transducer in establishing the operational signal equally effects both the first and second bed without affecting the efficiency of the oxygen separator.

It is an object of this invention to provide a fluid separator apparatus with a pneumatically actuated and electrically operated control to optimize the production of a product fluid from a fluid mixture.

It is another object of this invention to provide an oxygen separator having first and second beds of adsorption material with a control mechanism responsive to the fluid pressure in a supply conduit for shifting the communication of a supply fluid mixture between the first and second beds to optimize the production of a breathable fluid.

It is a further object of this invention to provide a two bed molecular sieve separator with an electronic control for regulating the duration of operation of each bed as a function of the adsorption of an element in a fluid mixture by a molecular sieve.

These and other objects should be apparent from reading this specification and viewing the drawings.

DETAILED DESCRIPTION OF THE INVENTION

Figures 1, 4:
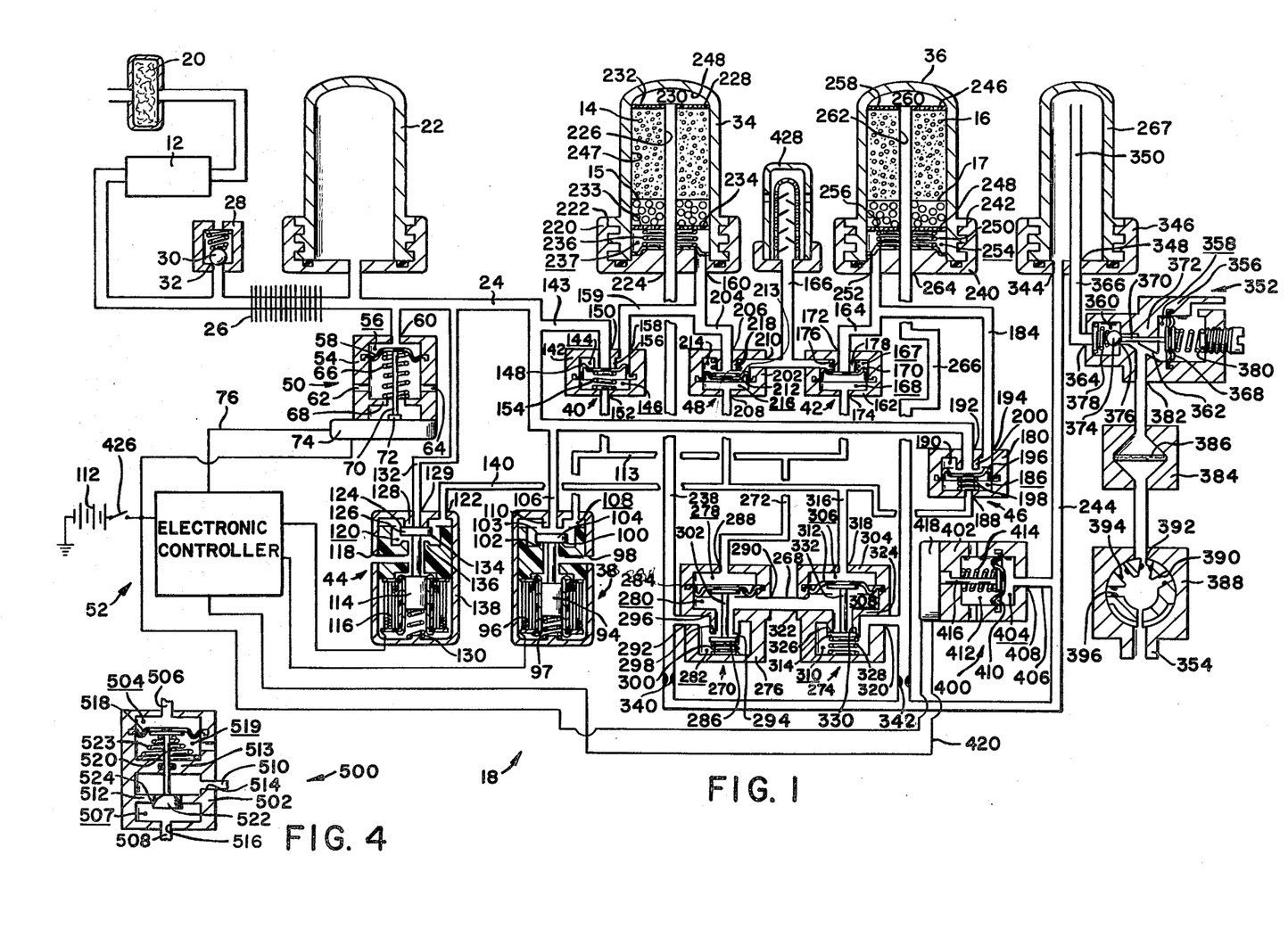
FIG. 1 is a diagrammatic illustration of a molecular sieve fluid separator system having a pneumatically actuated electronic cycle control made according to the principles of this invention.
FIG. 4 is a sectional view of a secondary balancing valve for use with the electronic cycle control for use in the fluid separator system.

The fluid separator system, shown in FIG. 1, includes a source of a pressurized fluid mixture which is sequentially supplied to first and second beds 14 and 16 of an adsorption material by a pneumatically actuated electronic controller 52 to produce a substantially continuous supply of breathable fluid for distribution to a recipient.

The source of pressurized fluid mixture is generated from air drawn through a filter 20 by a compressor 12. The filter 20 is designed to remove dust, and other airborne particles which may be harmful to operator of the compressor and beds of adsorption material.

To assure that the pressure of the fluid mixture does not exceed an unsafe level, a pressure relief valve 28 connected to the supply conduit 24 has a resiliently positioned poppet 30 that moves away from seat 32 and allows a portion of the fluid mixture to flow to the surrounding environment whenever the fluid pressure in the supply conduit exceeds a predetermined pressure level. To further condition the fluid mixture, any heat generated in the compressor 12 is removed by a heat exchanger 26, which consists of a plurality of fins that surround the supply conduit 24. The heat exchanger 26 is sized such that the temperature of the pressurized fluid mixture in the supply conduit 24 is no greater than 50° F. above the surrounding environment.

The supply conduit 24 communicates the fluid mixture from the compressor 12 to a surge tank 22. The surge tank 22 is connected to first and second beds 14 and 16 of adsorption material retained in containers 34 and 36.

A first series of valves consisting of a first solenoid valve 38, a first intake valve 40, and a first exhaust valve 42 control the communication of the fluid mixture from the supply conduit 24 into the first bed 14 of adsorption material retained in container 34.

A second series of valves consisting of a second solenoid valve 44, a second intake valve 46, and a second exhaust valve 48 control the communication of the fluid mixture from the supply conduit 24 into the second bed 16 of adsorption material retained in container 36.

The operation of the first and second solenoid valves 38 and 44 is controlled through an electrical signal developed in an electronic controller 52 in response to switching signals produced in a first pressure transducer 50.

In more particular detail, the first pressure transducer 50 includes a housing 54 with a pressure chamber 56 created therein by diaphragm 58 separating inlet port 60 from atmospheric ports 62 and 64. A spring 66 connected to wall 68 of the housing 54 urges the diaphragm 58 toward the pressure chamber 56 to hold an electrical contact 72 on stem 70 away from another electrical contact in switch 74. A lead line 76 connects switch 74 in the first pressure transducer 50 with the electronic controller 52.

Figure 2:
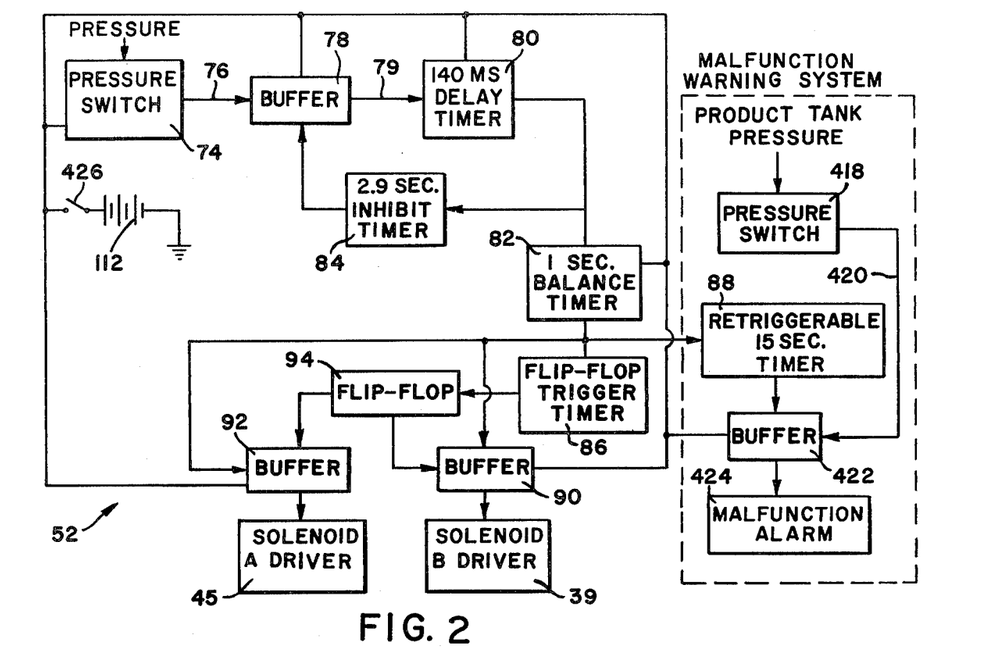
FIG. 2 is a block diagram of the electronic cycle control of FIG. 1.

The components in the electronic controller 52 are illustrated in block diagram form in FIG. 2 and respond to a switching signal from switch 74 to control the development of a first electrical signal for operating the first solenoid valve 38 and a second electrical signal for operating the second solenoid valve 44.

The components in the electronic controller 52 includes a first buffer 78 connected to lead 76 to a delay timer 80. The delay timer 80 provides an output signal for activating the balance timer 82 and an inhibit timer 84. If the switching signal communicated through lead 76 remains on for a predetermined time period equal to a fixed delay time of the delay timer 80, the inhibit timer 84 activates a switch in buffer 78 to inhibit the output of buffer 78 and thereby protect the system from false triggering when the pressure switch resets from closed to opened during sequential pressurization of the first and second beds. The balance timer 82 simultaneously triggers flip-flop trigger timer 86, a retriggerable 15 second timer 88 in the malfunction warning system, and supplies either buffer 90 or buffer 92, depending on the operational state of flip-flop 94, with an electrical operational signal.

Buffer 90 is designed to respond to the electrical operational signal and supply solenoid driver 39 with an operational signal. Solenoid driver 39 in turn supplies solenoid valve 38 with sufficient electrical current from source 112 to move plunger 94 into coil 96 in opposition to spring 97 and interrupt the flow path of air through port 98 when face 100 on poppet 104 engages seat 102. Thereafter, the pressurized fluid mixture flows through conduit 106, past seat 110 and into chamber 108 for distribution to the first intake and exhaust valves 40 and 42 respectively through conduit 113.

Similarly buffer 92 is designed to respond to the electrical operational signal and supply solenoid driver 45 with an operational signal. Solenoid driver 45 in turn supplies solenoid valve 44 with sufficient electrical current from source 112 to move plunger 114 into coil 116 by overcoming spring 130. Initial movement of plunger 114 moves face 124 on poppet 126 away from seat 128 to allow the pressurized fluid mixture to flow in conduit 132, into chamber 120. When plunger 114 approaches the center of coil 116 face 134 on poppet 126 engages seat 136 to prevent communication of the pressurized fluid mixture from the chamber 120 to the atmosphere through port 118 and initiate communication from chamber 120 through port 122 in housing 138 with conduit 140 going to the second intake and exhaust valves 48 and 46, respectively.

The first intake valve 40 has a housing 142 connected to the supply conduit 24 by conduit 143 and to the first container by conduit 159. The housing 142 has a first chamber 144 separated from a second chamber 146 by a diaphragm 148. A first port 150 in housing 142 connects chamber 144 with conduit 143 and a second port 152 connects chamber 146 with conduit 113. A spring 154 located in chamber 146 urges diaphragm 148 toward seat 156 through the communication of the pressurized fluid mixture through chamber 144 to port 158. Port 158 is connected by conduit 159 to port 160 in container 34 and in sequence with the operation of solenoid valve 44 provides a flow path for the pressurized fluid mixture to bed 14.

The first exhaust valve 42 has a housing 162 connected to the second container 36 by conduit 164, to an exhaust conduit 166, and to conduit 113 coming from solenoid valve 38. The housing 162 has a first chamber 167 separated from a second chamber 168 by a diaphragm 170. The first chamber 167 is connected to conduit 164 through port 172 while the second chamber 168 is connected to conduit 112 through port 174. A spring 176 located in chamber 167 urges the diaphragm 170 away from seat 178. When solenoid valve 38 is activated, the fluid mixture acts on diaphragm 170 to prevent communication between the interior of container 36 and the surrounding environment, however, when solenoid valve 44 is activated, spring 176 moves the diaphragm 170 away from seat 178 and allows free communication between bed 16 and the atmosphere.

The second intake valve 46 has a housing 180 connected to the supply conduit 24, to the second container 36 through conduit 184, and to the second solenoid valve 44 through conduit 140. The housing 180 has a first chamber 186 connected to conduit 140 through port 188 and a second chamber 190 connected to supply conduit 12 through port 192, and to conduit 184 through port 194. A diaphragm 196 attached to housing 180 separates the first chamber 186 from the second chamber 190 to prevent communication of the fluid mixture from the supply conduit 24 to the atmosphere or surrounding environment through conduit 140. A spring 198 located in chamber 186 urges the diaphragm 196 toward a seat 200 to inhibit fluid communication between the supply conduit 24 and the conduit 184 connected to container 36.

The second exhaust valve 48 has a housing 202 with a port 206 connected to the first container 34 through conduit 204, a port 208 connected to conduit 140, and a port 210 connected to exhaust conduit 166. A diaphragm 212 fixed in housing 202 separates a first chamber 214 associated with port 206 from a second chamber 216 associated with port 208. A spring 218 in chamber 214 urges diaphragm 212 away from seat 213. When solenoid valve 38 is activated, the fluid mixture acts on diaphragm 212 to prevent fluid communication between bed 14 and the surrounding environment, however, when solenoid valve 38 is deactivated, spring 218 moves diaphragm 212 away from the seat surrounding part 206 to allow free communication between bed 14 and the surrounding environment through exhaust conduit 166. In addition, when both solenoid valves 38 and 44 are deactivated, springs 176 and 218 move diaphragms 170 and 212 away from seats of ports 178 and 206, respectively to prevent the creation of a vacuum in either beds 14 or 16 which could draw air and any airborne contaminant into containers 34 and 36 which may deteriorate the adsorption material in beds 14 and 16.

In order to assure that the entire volume of fluid mixture from the supply conduit 24 is presented to the first and second beds 14 and 16 of adsorption material end caps 220 and 240 are attached to containers 34 and 36, respectively, through threaded connections 222 and 242 to seal the first and second beds 14 and 16 from the surrounding environment.

End cap 220 has a central opening 224 for connecting a first branch 238 of outlet conduit 244 with the first container 34. A tube 226 which extends from opening 224 to a point adjacent the bottom 248 of bore 247 in container 34 connects outlet branch 238 to a flow distribution chamber 230. A first retainer 228 is attached to the end of tube 226 and with the container 34 defines the flow distribution chamber 230 adjacent end 248. A second retainer 234 which surrounds tube 226 is held against bed 14 of adsorption material by a spring 236 to define a flow distribution chamber 237 adjacent end cap 220. Retainers 228 and 234 each have a series of perforations 232 and 233, respectively, thereon which retains the particles of adsorption material in a bed 14 while allowing the product fluid resulting from the fluid mixture to flow into the flow distribution chambers 230 and 237. The flow paths through the particles in bed 14 of the molecular sieve or adsorption material remains substantially constant since spring 236 continually urges retainer 234 toward retainer 228 to establish a fixed volume for bed 14. Thus, the density in the bed 14 does not change after repeated cycling and the particles do not degregate through size changes associated with movement of the particles.

Similarly, the density of the adsorption particles in bed 16 remains substantially constant since spring 250 continually urges retainer 248 toward retainer 246. The fluid mixture flows through inlet port 252 in end cap 240 and into the flow distribution chamber 254 for communication to the particles of the adsorption material in bed 16 by passing through perforations 256 in retainer 248. A component in the fluid mixture is retained in bed 16 of the adsorption material as a product fluid passes through perforations 258 in retainer 246 into a flow distribution chamber 260. The product fluid from the distribution chamber 260 flows into tube 262 and out port 264 for distribution through the second branch 266 to the outlet conduit 244 going to the supply chamber 267.

The first branch 238 and the second branch 266 of the outlet conduit 244 are connected to each other through an intermediate conduit 268. First and second valves 270 and 274 located in the intermediate conduit 268 control the communication of breathable fluid between the first branch 238 and the second branch 266.

The first valve 270 has a housing 276 with a cavity therein divided into a pressure chamber 278, a flow through chamber 280 and a distribution chamber 282. A first diaphragm 284 separates the pressure chamber 278 from the flow through chamber 280. The pressure chamber 278 is connected to conduit 112 by a conduit 272 attached to port 288. The flow through chamber 280 has a port 290 connected to the intermediate conduit 268 and the distribution chamber 282 is connected to the first branch 238 through port 292.

A wall 296 which separates port 290 from port 292 in the flow through chamber 280 has an annular seat 298. A spring 300 located in the atmospheric chamber 282 provides a constant force that urges face 294 on poppet 286 toward seat 298 to inhibit fluid communication between the flow through chamber 280 and the first branch 238. A stem 302 attached to poppet 286, in response to a pressure in chamber 278, moves face 294 away from seat 298 to allow free communication between conduit 268 and branch 238.

The second valve 274 has a housing 304 with a cavity therein divided into a pressure chamber 306, a flow through chamber 308, and a distribution chamber 310. A first diaphragm 312 separates the pressure chamber 306 from the flow through chamber 308. Pressure chamber 306 is connected to conduit 140 by conduit 316 attached to port 318. Distribution chamber 310 has a port 320 connected to the second branch 266 and the flow through chamber 308 is connected to the intermediate conduit 268 through port 322. A wall 324 in the flow through conduit 308 which separates port 320 from port 322 has an annular seat 326. A spring located in the distribution chamber 310 acts on poppet 314 to urge face 330 toward seat 326 to prevent fluid communication between chambers 308 and 310. Diaphragm 312 is also moved by spring 328 since stem 332 is attached to both diaphragm 312 and poppet 314. Since conduit 140 and pressure chamber 306 are connected to the atmosphere through the second solenoid valve 44, spring 328 seats face 330 of poppet 314 on seat 326 to prevent fluid communication between conduit 268 and branch 266 in the outlet conduit.

However, branches 238 and 266 of the outlet conduit 244 are constantly connected through restricted orifices 340 and 342 to permit a portion of the resultant product fluid produced in the first and second beds 14 and 16 to purge the component from the bed not receiving the fluid mixture from the supply conduit 24.

The outlet conduit 244 is connected to storage container 267 through an entrance port 344 in cap 346. A tube 350 which extends through exit port 348 in cap 346 connects the storage container 267 with a pressure regulator 352. The pressure regulator 352 controls the pressure at which the product fluid is supplied to the recipient through conduit 354.

The pressure regulator 352 has a housing 356. The housing 356 has a control chamber 358 connected to a pressure chamber 360 by a passage 362. A port 364 connects the pressure chamber 360 with conduit 366 attached to outlet port 348 in the storage container 267. A diaphragm 368 attached to housing 356 separates the control chamber 358 from the atmosphere. A stem 370 attached to diaphragm 368 extends through bearing wall 372 and into pressure chamber 360. A ball 374 which is fixed to stem 370 and urged toward seat 376 by a spring 378. However, spring 380 acts on diaphragm 368 to urge ball 374 away from seat 376. As the pressure in the pressure chamber 358 builds up, spring 380 is overcome and ball 374 is urged against seat 376 to interrupt the flow of product fluid into passage 362. Housing 356 also has port 382 which connects passage 362 with a filter 384 in the supply conduit 354. Element 386 in filter 384 is designed to remove harmful bacteria that may be carried by the product fluid.

In addition, a flow selector 388 has a plurality of different orifices 390, 392, 394, 396 which control the rate of flow of the product fluid from the supply conduit 354 to provide the recipient with a product fluid at a constant pressure.

In order to check the operation of the operation of the first and second beds 16 and 18, the pressure of the product fluid is continually monitored through the use of a second pressure transducer 400. The second pressure transducer 400 has a housing 402 with a pressure chamber 404 connected by conduit 406 to the outlet conduit 244 through port 408. A diaphragm 410 separates pressure chamber 404 from an atmospheric chamber 412 to allow spring 414 to hold a contact on stem 416 away from a contact in electrical switch 418. Switch 418 is connected to electronic controller 52 by lead 420. As shown in FIG. 2, lead 420 is connected to a buffer 422. Buffer 422 amplifies any failure signal from switch 418 and provides an indicator 424 such as a bell, light, buzzer, etc., with an actuation signal of a low pressure or failure condition present in the breathing system 18. In addition if the retriggerable timer 88 if allowed to "time out" also signals a malfunction in the oxygen separator. In this condition, either one or the other bed 14 and 16 is taking too long a time to pressurize and thereafter the timer 88 supplies buffer 422 with a failure signal. This failure signal in turn also operates indicator 424.

MODE OF OPERATION OF THE INVENTION

The fluid separator system 18, shown in FIG. 1, is placed in an operational condition upon closure of switch 426 to supply compressor 12 and electronic controller 52 with electrical energy from source 112. Flip-flop 94 is either supplying buffer 90 or buffer 92 with an electrical operational signal, therefore, even upon initial actuation either solenoid valve 38 or 44 is being supplied with electrical energy. For illustrative purposes assume the electrical signal from flip-flop 94 is being communicated to buffer 90. Thus, the first solenoid valve 38 is supplied with a first electrical energy signal sufficient to move plunger 94 into coil 90 and position face 100 on seat 102 to prevent communication between chamber 105 and the surrounding environment.

At the same time compressor 12 is drawing air from the environment and pressurizing the same to produce a pressurized fluid mixture tnat is communicated to the supply conduit 24 and surge tank 22. The pressurized fluid mixture in the supply conduit 24 is simultaneously transmitted to the first intake valve 40, and first exhaust valve 42 through the conduits 106, chamber 105, and conduit 113.

The force of the pressurized fluid mixture in chamber 146 of the first intake valve 40 is combined with spring 154 and acts on diaphragm 148 to seal seat 156 to prevent the communication of pressurized fluid mixture through port 150. At the same time, the pressurized fluid mixture in chamber 168 of the first intake valve 42 overcomes spring 176 to urge diaphragm 70 against seat 178 and prevent fluid communication from bed 16 to the atmosphere through port 172.

In addition, the pressurized fluid mixture in conduit 113 is communicated through conduit 272 to chamber 278 of first valve 270. The pressurized fluid mixture in chamber 278 acts on diaphragm 284 to move face 294 of poppet 286 away from seat 298 and allow fluid communication from intermediate conduit 268 to the first branch 238.

At the same time, since the second solenoid valve 44 is de-energized and spring 130 moves face 124 on poppet 126 fixed to plunger 114 against seat 128 to prevent the communication of the pressurized fluid mixture through port 129. In this condition, spring 218 in the second exhaust valve 48 moves diaphragm 212 away from the seat of port 206 and allows free communication of bed 14 in first container 34 with the atmosphere through exhaust conduit 166. However, spring 328 in the second valve 274 moves face 330 of poppet 314 against seat 326 to prevent communication from the second branch 266 of the outlet conduit 244 to the intermediate conduit 268.

Thereafter, the pressurized fluid mixture in the supply conduit 24 flows past seat 196 in the second inlet valve 46 and into the second bed 16 of adsorption material by way of conduit 184 and flow distribution chamber 254. The fluid mixture passes through the particles of adsorption material in the second bed 16 where a component or components are adsorbed as a product fluid passes into flow distribution chamber 260. The product fluid flows from distribution chamber 260 through tube 262 and into the second branch 266 for distribution through outlet conduit 244 to the supply container 266. At the same time a portion of the product fluid in outlet conduit 244 flows past restriction 340 and through the first branch 238 to flow distribution chamber 230. The pressurized product fluid flows past retainer 228 and through the particles of adsorption material in bed 14 where the retained component or components are desorbed from the particles and carried to the atmosphere after passing through distribution chamber 237, port 160 in end cap 220, conduit 204, exhaust valve 48 and exhaust conduit 166.

To reduce any noise that may occur in the communication of the purge mixture to the environment, a muffler 428 is attached to the end of the exhaust conduit 166.

Figure 3:
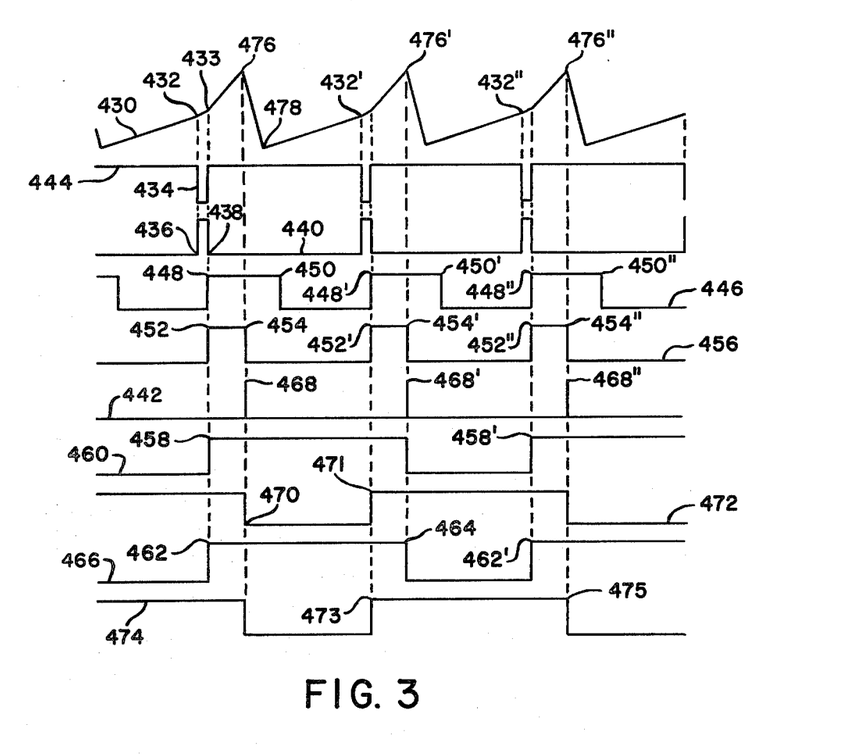
FIG. 3 is a logic diagram illustrating the operation of the components in the electronic cycle control.

As more of the component or components in the fluid mixture are retained by the particles of adsorption material in bed 16, the fluid pressure in the supply conduit 24 builds up and follows a curve as illustrated on curve 430 in FIG. 3. The increase in the fluid pressure in the supply conduit 24 is communicated to chamber 56 in the first transducer 50. When the fluid pressure reaches a predetermined pressure level as illustrated by point 432, spring 66 is overcome and diaphragm 58 moves contact on stem 66 into engagement with electrical contact on switch 74.

With the closure of switch 74 an electrical signal is carried on lead 76 to buffer 78. The electrical signal when received by buffer 78 changes the logic state of the buffer 78 from high to low as illustrated by line 434 in FIG. 3. The delay timer 80 is triggered by the buffer 78 for a predetermined time period, illustrated by the interval between points 436 and 438 in curve 440 in FIG. 3. When the delay timer 80 "times out", illustrated by section 434 of line 444, a trigger signal is communicated to the one second timer 82 and inhibit timer 84. The inhibit timer 84 follows a curve illustrated by line 446 and after the time period interval between points 436 and 438 prevents the buffer 78 from being cycled until a time period equal the time interval between points 448 and 450 has passed.

At the same time timer 82 supplies buffer 92 with a transfer electrical signal for a time period equal to the interval between points 452 and 454 on curve 456. At point 454, timer 82 initiates actuation of flip-flop trigger 86 and reset timer 88.

When buffer 92 receives the transfer electrical signal from timer 82, a second electrical signal flows from buffer 92. The second electrical signal has an amplitude illustrated by point 458 in curve 460 in FIG. 3. The second electrical signal is transmitted to solenoid driver 45 which in turn energizes coil 116 in the second solenoid valve 44 for a time period illustrated by the time interval between point 462 and 464 on curve 466.

With coil 116 energized, plunger 114 moves to the center of coil 116 and urges face 134 onto seat 136 to interrupt communication of chamber 120 with the surrounding environment through port 118. Thereafter, fluid mixture in the supply conduit 24 flows into conduit 140 and acts on diaphragm 196 in the second intake valve 46 and seats diaphragm 196 on seat 200 to inhibit the flow of the fluid mixture through inlet port 192 of the second intake valve 46. At the same time, this fluid mixture flows into chamber 216 of the second exhaust valve 48 and urges diaphragm 212 against the seat of port 206 to interrupt fluid communication from bed 14 to the atmosphere through exhaust conduit 166. In addition, this same fluid mixture flows into chamber 306 of the second valve 274 and acts on diaphragm 312 to move face 330 on poppet 314 away from seat 326 and open fluid communication between the intermediate conduit 268 and the second branch 266. Since solenoid valve 38 is still energized, the pressurized fluid mixture still holds face 294 of the first valve 270 away from seat 298 to allow free communication between branches 238 and 266 and allow the fluid pressure in the first and second beds 14 and 16 to equalize during the simultaneous actuation of the first and second solenoid valves 38 and 44.

At the end of the time interval illustrated between points 452 and 454 on line 456, flip-flop trigger timer 86, transmits a spike signal 468 illustrated by curve 442 in FIG. 3 to flip-flop 94. Thereafter, the electrical signal from flip-flop 94 switches from buffer 90 to buffer 92 to sustain the amplitude of the second electrical signal 458 from buffer 90. At the same time, the output from buffer 90 is reduced to zero as illustrated by point 470 on curve 472. With the electrical signal from buffer 90 interrupted, coil 96 of solenoid valve 38 is deenergized and follows a curve illustrated by line 474 in FIG. 3.

During the time interval illustrated between points 452 and 454, the fluid pressure in the supply conduit 24 and surge tank 22, builds up to a point 476. When coil 96 of solenoid valve 38 is deenergized, spring 97 moves face 103 on plunger 94 against seat 110 to interrupt communication from supply conduit 24 through conduit 106. Thereafter, spring 176 in the first exhaust valve 42 moves diaphragm 170 away from seat 178 to initiate communication of bed 16 to the atmosphere through flow distribution chamber 254 and exhaust conduit 166.

Thereafter, the pressure of the fluid mixture acts on diaphragm 148 in the first inlet valve 40 to allow the fluid mixture to flow past seat 156 for distribution to the first bed 14 of adsorption material. A component or components is retained in bed 14 as a product fluid passes into flow distribution chamber 230 for transmission to the outlet conduit 244 through branch 238.

Initial communication of the product breathable fluid mixture from the supply conduit 24 causes a reduction in the fluid pressure in conduit 24 as illustrated by point 478 on curve 430. Thereafter, as the component or components are retained in the particles of adsorption material in bed 14, the fluid pressure in the supply conduit 24 again starts to increase and when the pressure equals that illustrated by point 432', the pressure transducer 52 again activates switch 74 to initiate the transfer of the supply of fluid mixture to bed 16. Thereafter, the one second timer 82 supplies buffer 90 with an electrical signal as illustrated by point 471 on curve 472 in FIG. 3.

Thus, solenoid 38 is supplied with electrical current for a time interval illustrated by points 473 and 475 on curve 474 in FIG. 3. As seen in FIG. 3, the solenoid valves 38 and 44 are simultaneously energized to again allow valves 270 and 274 to operate and permit the pressures in beds 14 and 16 to equalize before the fluid mixture in the supply conduit 24 is sequentially transferred. This cycling continues as long as the breathing system 18 is in operation.

In an effort to reduce the number of components in breathing system 18, valves 270 and 274 in the intermediate conduit 268 were replaced by a single valve 500 illustrated in FIG. 4.

The single valve 500 has a housing 502 with a pressure chamber 504 directly connected to the supply conduit 24 by conduit 506 and a flow through chamber 507 connected to branch 238 of the outlet conduit 244 by conduit 508 and to branch 266 by conduit 510. A wall 512 separates the port 514 from port 516 while diaphragm 518 separates the pressure chamber 504 from an atmospheric chamber 519. A stem 520 attached to diaphragm 518 extends through wall 513. A poppet 522 attached to stem 520 is located in chamber 506. A spring 523 connected to wall 513 urges poppet 522 against seat 524 to prevent fluid communication between the first branch 238 and the second branch 266 through the intermediate conduit.

Thereafter during a cycle of operation when switch 52 is activated at pressure 432, and the solenoid valves 38 and 44 are simultaneously activated, spring 522 is overcome by the pressure build-up in the supply conduit 24. Fluid communication exists between the first branch 238 and the second branch 266 during the time period that the pressure increases from point 433 to point 476. Thereafter, when the electronic controller 52 switches the communication of the supply of fluid mixture between the first and second beds 14 and 16, the pressure in the supply conduit drops to point 478, thereafter, spring 523 urges poppet 522 onto seat 524 to interrupt communication between the first and second branches 238 and 266 and allows the product fluid to flow to the storage container 267.

Thus, the transfer of the operational communication of the fluid mixture is dependent on the fluid pressure developed in the supply conduit 24. However, if the operational time period that either beds 14 or 16 exceeds a predetermined time period as established by timer 88, a signal is transmitted to buffer 422 and malfunction indicator 424 is activated to inform an operator of a potential failure condition in the breathing system 18.

It should be noted that the extraction system 18 can be utilized to produce either oxygen or nitrogen as the product fluid simply by changing the type of adsorption material in beds 14 and 16.

In addition the adsorption material in beds 14 and 16 can be selected to remove water prior to the retention of the adsorable component. In this case a screen 15 and 17 are placed in beds 14 and 16 to separate material A from material B. Thus, the adsorption material under such conditions is always presented as a dry fluid mixture and the possibility of deterioration of the adsorption material further reduced.

We claim:

1. In a breathing system wherein a breathable fluid is separated from a source of fluid mixture through the retention of at least one element in the fluid mixture by an adsorption material located in first and second chambers, control means for regulating the sequential communication of the fluid mixture to the first and second chambers comprising:

a supply conduit for communicating the fluid mixture from the source to said first and second chambers, the pressure of the fluid mixture in said supply conduit varying with the rate of flow and adsorption of the element of the fluid mixture in said first and second chambers;

first transducer means connected to said supply conduit and responsive to a predetermined fluid pressure in the fluid mixture for establishing a switching signal;

electronic means connected to said first transducer means and responsive to said switching signal for sequentially developing a first electrical signal and a second electrical signal, said electronic means permitting said first and second electrical signals to overlap for a predetermined time period;

first valve means connected to said supply conduit and responsive to said first electrical signal for preventing communication of the fluid mixture to the first chamber and allowing communication of the fluid mixture to the second chamber during a first mode in a cycle of operation; and second valve means connected to said supply conduit and responsive to said second electrical signal for preventing communication of the fluid mixture to the second chamber and allowing communication of fluid to the first chamber during a second mode in a cycle of operation, said overlap of the communication of the first and second electrical signals allowing the fluid pressure of the fluid mixture in the first and second chambers to equalize before proceeding to the first and second modes in a cycle of operation.

2. In the breathing system as recited in claim 1, further including:

an outlet conduit having a first branch connected to said first chamber and a second branch connected to said second chamber for communicating the breathable fluid to a storage container;

second transducer means connected to said outlet conduit for generating a failure signal corresponding to a predetermined minimum fluid pressure in the breathable fluid; and an indicator connected to said second transducer, said failure signal activating said indicator to inform an operator of said minimum fluid pressure condition in the breathable fluid.

3. In the breathing system, as recited in claim 2, wherein said electronic means includes:

switch means connected to said indicator for resetting said indicator with a shift in operation between the first and second modes of operation to nullify the failure signal with an increase in the fluid pressure of the breathable fluid above the minimum fluid pressure.

4. In the breathing system, as recited in claim 2, further including:

an intermediate conduit for connecting said first branch with said second branch of the outlet conduit; and third valve means located in said intermediate conduit and connected to said supply conduit, said third valve means being responsive to the pressure of the fluid mixture in said supply conduit during the simultaneous operation of said first and second valve means for allowing unrestricted communication between the first and second chambers.

5. In the breathing system, as recited in claim 4, wherein said third valve means includes:

a housing having a cavity therein with a first port connected to said first branch, a second port connected to said second branch, and a third port connected to said supply conduit;

wall means for separating said third port from the first and second ports to establish a pressure chamber within said cavity; and resilient means connected to said housing for urging said wall means toward one of said first and second ports to prevent fluid communication through the intermediate conduit, the fluid pressure in the supply conduit during the simultaneous operation of the first and second valves overcoming the resilient means and moving said wall means away from said one of the first and second ports to permit the fluid pressure of the fluid mixture to equalize in the first and second chambers.

6. In the breathing system, as recited in claim 4, wherein said first valve means includes:

a first solenoid valve connected to said electronic means for regulating the communication of a first pressure signal in response to said first electrical signal;

a first exhaust valve connected to said first chamber and responsive to said first pressure signal for communicating the first chamber with the surrounding environment; and a first intake valve connected to said supply conduit and responsive to said first pressure signal for preventing the flow of the pressurized fluid mixture from said supply conduit into said first chamber of adsorption material.

7. In the breathing system, as recited in claim 6, wherein said second valve means includes:

a second solenoid valve connected to said electronic means for regulating the communication of a second pressure signal in response to said second electrical signal;

a second exhaust valve connected to said second chamber and responsive to said second pressure signal for communicating the second chamber with the surrounding environment; and a second intake valve connected to said supply conduit and responsive to said second pressure signal for preventing the flow of the pressurized fluid mixture from said supply conduit into said second chamber of adsorption material.

8. In the breathing system, as recited in claim 7, wherein said third valve means includes:

a housing having a cavity therein with a first port connected to receive said first pressure signal from said first solenoid valve, a second port connected to receive said second pressure signal from said second solenoid valve, a third port connected to said first branch of the intermediate conduit, and a fourth port connected to said second branch of the intermediate conduit;

first equalizer valve means located in said cavity for limiting the communication of said first pressure signal to a first chamber adjacent said first port;

first resilient means for urging said first equalizer valve means toward a first seat to prevent communication from the cavity to the first branch through said third port;

second equalizer valve means located in said cavity for limiting the communication of said second pressure signal to a second chamber adjacent said second port; and second resilient means for urging said second equalizer valve means toward a second seat to prevent communication from the cavity to the second branch through said fourth port, said simultaneous communication of the first and second pressure signals to the first and second chambers moving said first and second equalizer valve away from said third and fourth ports to allow unrestricted fluid communication through said cavity to permit said pressure equalization to be achieved in said first and second chambers.

9. In the breathing system, as recited in claim 8, wherein said electronic means includes:

timer means for inhibiting said switching signal for a predetermined time period to prevent the creation of a false switching signal caused by a resetting of said first transducer means by the fluid pressure of the fluid mixture in the supply conduit.

10. In the breathing system as recited in claim 2 further including:

a first restriction located in said first branch; and a second restriction located in said second branch, said first and second restrictions causing a back pressure to develop in said bed of adsorption material receiving the fluid mixture to control the rate of adsorption of the component in the fluid mixture.

11. A fluid separator system comprising:

a source of fluid mixture under pressure;

a first container having a first chamber therein for retaining a quantity of adsorption material, said first chamber having a first port and a second port;

a second container having a second chamber therein for retaining a quantity of adsorption material, said second chamber having a third port and a fourth port;

a supply conduit for connecting said source of fluid mixture with said first and third ports, the fluid pressure in said supply conduit being a function of the rate of flow of said source of fluid mixture through said first and second chambers and rate of adsorption of an element in said fluid mixture by the adsorption material;

first transducer means connected to said supply conduit and responsive to a predetermined pressure of the fluid mixture in said supply conduit for developing a switching signal;

electronic means connected to said transducer means and responsive to said switching signal for sequentially developing first and second electrical signal, said first and second electrical signals overlaping for a predetermined time period;

first valve means connected to said supply conduit and said electronic means, said first valve means being responsive to said first electrical signal for preventing the communication of the pressurized fluid mixture through said first port while allowing communication of the fluid mixture through said third port, said fluid mixture flowing through said third port and into said second chamber where at least one element of the fluid mixture is retained by the adsorption material to produce a product fluid during a first mode in a cycle of operation;

second valve means connected to said supply conduit and said electronic means, said second valve means being responsive to said second electrical signal for preventing the communication of the pressurized fluid mixture through said third port while allowing communication of the fluid mixture through said port, said fluid mixture flowing through said first port and into said first chamber where at least one element of the fluid mixture is retained by the adsorption material to produce a product fluid during a second mode in a cycle of operation; and an outlet conduit having a first branch connected to said second port and a second branch connected to said fourth port, said product fluid flowing through said outlet conduit to a storage container, a portion of said product fluid flowing through said first branch past said second port and into said first chamber for purging the adsorption material of any retained element during said first mode of a cycle of operation and through said second branch past said fourth port and into said second chamber for purging the adsorption material of any retained element during said second mode of a cycle of operation, said overlaping of the first and second electrical signals simultaneously operating said first and second valve means to prevent the flow of the fluid mixture in the first and second chamber while allowing pressure equalization in the first and second chamber through the communication of said second and fourth ports with said outlet conduit.

12. The fluid separator system, as recited in claim 11, further including:
second transducer means connected to said outlet conduit and responsive to a minimum fluid pressure of the product fluid for developing a low pressure warning signal; and
indicator means connected to said second transducer means and responsive to said warning signal for informing an operator of a minimum fluid pressure condition in the product fluid.

13. The fluid separator system, as recited in claim 12, wherein said electronic means includes:
timer means connected to said indicator means and responsive to said switching signal from said first transducer means to inform an operator whenever the first and second electrical signals which operate the first and second valves, respectively, exceeds a preset time.

14. The fluid separator system, as recited in claim 11, further including:
a housing having a cavity with a first pressure port connected to said first valve means, a second pressure port connected to said second valve means, a first flow through port connected to the first branch of the outlet conduit, and a second flow through port connected to the second branch of the outlet conduit;
a first diaphragm means fixed to said housing for defining a first pressure chamber adjacent said first pressure port, said first diaphragm responding to the operation of said first valve means to only allow fluid communication from the cavity to said first branch; and
a second diaphragm means fixed to said housing for defining a second pressure chamber adjacent said second pressure port, said second diaphragm means responding to the operation of said second valve means to only allow fluid communication from said cavity to the second branch, said first and second diaphragm means responding to the simultaneous operation of said first and second valve to allow communication between said first and second branches of the outlet conduit through said cavity and thereby permit the fluid pressure in the first and second chambers to equalize.

15. The fluid separator system, as recited in claim 14, further including:

a first tube extending from said second port in said first container through said quantity of adsorption material retained therein;
a first retainer attached to said first tube and cooperating with said first container to establish a first distribution chamber within said chamber adjacent the end of said tube;
a second retainer surrounding said tube and cooperating with said first container to establish the volumetric limits for a first bed of adsorption material;
a first cap attached to said first container for sealing said first container from the surrounding environment; and
a first spring connected to said first cap for urging said second retainer toward said first retainer to place a uniform force on said first bed of adsorption material and thereby maintain substantially the same density of the adsorption material after repeated cycles of operation.

16. The fluid separator system, as recited in claim 15, further including:
a second tube extending from said fourth port in said second container through said quantity of adsorption material retained therein;
a third retainer attached to said second tube and cooperating with said second container to establish a third distribution chamber within said second chamber adjacent the end of said second tube;
a fourth retainer surrounding said second tube and cooperating with said second container to establish the volumetric limits for a second bed of adsorption material;
a second cap attached to said second container for sealing said second container from the surrounding environment; and
a second spring connected to said second cap for urging said fourth retainer toward said third retainer to place a uniform force on said second bed of adsorption material and thereby maintain substantially the same density of the adsorption material after repeated cycles of operation.

17. The fluid separator system, as recited in claim 11, further including:
a first screen located in said first chamber; and
a second screen located in said second chamber, said first and second screens separating a first adsorption material from a second adsorption material, said first adsorption material removing moisture from said fluid mixture to produce a dry fluid mixture to the second adsorption material where the element is removed to produce the product fluid.

18. The fluid separator, as recited in claim 17, further including:
a filter located in said outlet conduit for removing any air borne bacteria from the product fluid that could harm a recipient of the product fluid.

19. In a system having first and second valves sequentially operated to communicate a pressurized fluid mixture from a supply conduit to first and second beds of adsorption material, respectively, wherein a substantially identical product fluid is produced through the retention of at least one element in the fluid mixture in the first and second beds, said first and second beds being connected to an outlet conduit for distributing the product fluid, control means for operating said first and second valves comprising:
a single sensor located in said supply conduit and responsive to a predetermined change in the fluid pressure of the fluid mixture caused by the adsorption of the element by said adsorption material for establishing a switching signal; and electronic means connected to said sensor and responsive to said switching signal for developing first and second signals for sequentially operating said first and second valves, said first and second signals overlapping for a predetermined time period to allow the fluid pressure in the first and second beds to equalize before the fluid mixture is presented thereto.

20. In the system recited in claim 19 further including:
an indicator in the outlet conduit for informing an operator of a minimum fluid pressure in the product fluid.

21. In the system recited in claim 20 further including:
switch means connected to said indicator for resetting said indicator with an increase in the fluid pressure of the product fluid resulting from a shift in the communication of the fluid mixture from one of the first and second beds to the other.

22. In the system recited in claim 21 further including:
timer means for inhibiting said switching signal for a predetermined time period to prevent the creation of a false switching signal caused by pulsations in the fluid pressure of the fluid mixture in the supply conduit.

23. In a system having first and second valves sequentially operated by a control to communicate a pressurized fluid mixture from a supply conduit to first and second beds of adsorption material, respectively, wherein a substantially identical product fluid is produced through the retention of at least one element in the fluid mixture in the first and second beds, said product fluid being communicated from the first and second beds by an outlet conduit, the improvement comprising:
a single sensor located in said supply conduit and responsive to the change in the fluid pressure caused by the sequential adsorption of the element by said adsorption material in said first and second beds for establishing a substantially identical switching signal;
means for inhibiting said switching signal to prevent the creation of a false switching signal caused by pressure surges in the fluid pressure of the fluid mixture; and
electronic means connected to said sensor and responsive to said switching signal for operating said first and second valves to assure that the product fluid is substantially the same consistency at all times.

24. In the system, as recited in claim 23 further including:
an indicator in the outlet conduit to inform an operator of the pressure of at least a minimum fluid pressure in the product fluid.

25. In a system having first and second valves sequentially operated to communicate a pressurized fluid mixture from a supply conduit to first and second beds of adsorption material, respectively, wherein a substantially identical product fluid is produced through the retention of at least one element in the fluid mixture in the first and second beds, said first and second beds being connected to an outlet conduit for distributing the product fluid, control means for operating said first and second valves comprising:
a single sensor located in said supply conduit and responsive to a predetermined change in the fluid pressure of the fluid mixture caused by the adsorption of the element by said adsorption material for establishing a switching signal; and
electronic means connected to said sensor and responsive to said switching signal for developing first and second signals for sequentially operating said first and second valves to assure that the product fluid is of substantially the same consistency at all times.

26. In the system recited in claim 25 further including:
an indicator in the outlet conduit for informing an operator of a minimum fluid pressure in the product fluid.

27. In the system recited in claim 26 further including:
switch means connected to said indicator for resetting said indicator with an increase in the fluid pressure of the product fluid resulting from a shift in the communication of the fluid mixture from one of the first and second beds to the other.

28. In the system recited in claim 27 further including:
timer means for inhibiting said switching signal for a predetermined time period to prevent the creation of a false switching signal caused by pulsations in the fluid pressure of the fluid mixture in the supply conduit.

29. A fluid separator system comprising:
a source of fluid mixture under pressure;
a first container having a first chamber therein for retaining a quantity of adsorption material, said first chamber having a first port and a second port;
a second container having a second chamber therein for retaining a quantity of adsorption material, said second chamber having a third port and a fourth port;
a supply conduit for connecting said source of fluid mixture with said first and third ports, the fluid pressure in said supply conduit being a function of the rate of flow of said source of fluid mixture through said first and second chambers and rate of adsorption of an element in said fluid mixture by the adsorption material;
first transducer means connected to said supply conduit and responsive to a predetermined pressure of the fluid mixture in said supply conduit for developing a switching signal;
electronic means connected to said first transducer means and responsive to said switching signal for sequentially developing first and second electrical signals;
first valve means connected to said supply conduit and said electronic means, said first valve means being responsive to said first electrical signal for preventing the communication of the pressurized fluid mixture through said first port while allowing communication of the fluid mixture through said third port, said fluid mixture flowing through said third port and into said second chamber where at least one element of the fluid mixture is retained by the adsorption material to produce a product fluid during a first mode in a cycle of operation;
second valve means connected to said supply conduit and said electronic means, said second valve means being responsive to said second electrical signal for preventing the communication of the pressurized fluid mixture through said third port while allowing communication of the fluid mixture through said port, said fluid mixture flowing through said first port and into said first chamber where at least one element of the fluid mixture is retained by the adsorption material to produce a product fluid during a second mode in a cycle of operation; and
an outlet conduit having a first branch connected to said second port and a second branch connected to said fourth port, said product fluid flowing through said outlet conduit to a storage container, a portion of said product fluid flowing through said first branch past said second port and into said first chamber for purging the adsorption material of any retained element during said first mode of a cycle of operation and through said second branch past said fourth port and into said second chamber for purging the adsorption material of any retained element during said second mode of a cycle of operation.

30. In a system having first and second valves sequentially operated by a control to communicate a pressurized fluid mixture from a supply conduit to first and second beds of adsorption material, respectively, wherein a substantially identical product fluid is produced through the retention of at least one element in the fluid mixture in the first and second beds, said product fluid being communicated from the first and second beds by an outlet conduit, the improvement comprising:

a single sensor located in said supply conduit and responsive to the change in the fluid pressure caused by the sequential adsorption of the element by said adsorption material in said first and second beds for establishing a substantially identical switching signal;

electronic means connected to said sensor and responsive to said switching signal for operating said first and second valves to assure that the product fluid is substantially the same consistency at all times.

31. In the system, as recited in claim 30 further including:

an indicator in the outlet conduit to inform an operator of the pressure of at least a minimum fluid pressure in the product fluid.

32. In the system, as recited in claim 30 further including:

means for inhibiting said switching signal to prevent the creation of a false switching signal caused by pressure surges in the fluid pressure of the fluid mixture.

33. In the system, as recited in claim 30 further including:

a filter located in said outlet conduit for removing any airborne bacteria from the product fluid that could harm a recepient of the product fluid.

* * * * *